United States Patent [19]

Ichioka et al.

[11] Patent Number: 5,696,680
[45] Date of Patent: Dec. 9, 1997

[54] ELECTRIC MOTORCAR DRIVE SYSTEM HAVING SHIFT-LEVER OPERATED CLUTCH MEANS BETWEEN ELECTRIC MOTOR AND SPEED REDUCTION GEAR

[75] Inventors: Eiji Ichioka; Kinya Yoshii; Takeharu Koide, all of Toyota; Kojiro Kuramochi, Numazu; Koichi Tanaka, Mishima, all of Japan

[73] Assignee: Toyota Jidosha Kabushiki Kaisha, Toyota, Japan

[21] Appl. No.: 114,539

[22] Filed: Aug. 31, 1993

[30] Foreign Application Priority Data

Sep. 1, 1992 [JP] Japan ................................ 4-257136

[51] Int. Cl.$^6$ ................................................ G06G 7/70
[52] U.S. Cl. .......................... 364/424.096; 364/424.08; 364/424.083; 364/426.043; 364/424.089; 180/65.1; 180/65.6; 180/292; 475/261
[58] Field of Search ................... 192/70.16; 364/426.04, 364/424.096, 426.043, 424.08, 424.083; 74/335; 180/65, 292; 475/121, 271, 283

[56] References Cited

U.S. PATENT DOCUMENTS

| | | | |
|---|---|---|---|
| 3,623,568 | 11/1971 | Mori | 180/65 A |
| 3,861,484 | 1/1975 | Joslin | 180/65 A |
| 4,328,717 | 5/1982 | Arai | 74/760 |
| 4,351,405 | 9/1982 | Fields et al. | 180/65 |
| 4,361,060 | 11/1982 | Smyth | 477/78 |
| 4,509,125 | 4/1985 | Fattic et al. | 364/424.1 |
| 4,734,861 | 3/1988 | Bertolasi et al. | 364/424.1 |
| 4,771,386 | 9/1988 | Yasue et al. | 364/424.1 |
| 4,799,158 | 1/1989 | Patil | 364/424.1 |
| 4,821,190 | 4/1989 | Patil | 364/424.1 |
| 4,855,914 | 8/1989 | Davis et al. | 364/424.1 |
| 4,856,360 | 8/1989 | Yoshimura et al. | 74/335 |
| 4,967,610 | 11/1990 | Sasajma et al. | 74/866 |
| 5,001,900 | 3/1991 | Sasajma et al. | 60/327 |
| 5,007,299 | 4/1991 | Bulgrien | 74/335 |
| 5,060,176 | 10/1991 | Nawa et al. | 364/579 |
| 5,088,043 | 2/1992 | Akishino et al. | 364/426.04 |
| 5,101,924 | 4/1992 | Yamagiwa et al. | 180/65.8 |
| 5,117,931 | 6/1992 | Nishida | 180/65.2 |
| 5,172,784 | 12/1992 | Varela, Jr. | 180/65 A |
| 5,226,339 | 7/1993 | Donato et al. | 74/375 |
| 5,289,890 | 3/1994 | Toyoda et al. | 180/65.8 |

*Primary Examiner*—Kevin J. Teska
*Assistant Examiner*—Thai Phan
*Attorney, Agent, or Firm*—Kenyon & Kenyon

[57] ABSTRACT

A drive system for an electric motor vehicle, for transmitting a rotary motion of an electric motor to a drive wheel through a speed reducing device, the system including a clutch device clutch for connection and disconnection between the electric motor and the drive wheel, a shift lever having a drive position and a neutral position, and a clutch operating mechanism which operatively connects the shift lever and the clutch device such that the clutch device is placed in its connecting and disconnecting positions when the shift lever is operated to the drive and neutral positions, respectively.

17 Claims, 9 Drawing Sheets

ELECTRIC MOTORCAR DRIVE SYSTEM HAVING SHIFT-LEVER OPERATED CLUTCH MEANS BETWEEN ELECTRIC MOTOR AND SPEED REDUCTION GEAR

BACKGROUND OF THE INVENTION

1. Field of the Invention

The present invention relates in general to a drive system for an electric vehicle, and more particularly to such a drive system capable of easily disconnecting a power transmission line between an electric motor and drive wheels of the vehicle in the event of abnormality of the motor or any other components.

2. Discussion of the Prior Art

An electromobile driven by an electric motor is generally equipped with a speed reduction gear adapted to boost a torque of the electric motor before the torque is transmitted to the drive wheels of the vehicle. An example of the electromobile is disclosed in JP-A-3-265751, which has a three-axis type speed reducing gear device whose input shaft is connected to the output shaft of an electric motor. As another type of speed reducing gear device for an electric motor vehicle, it has been proposed to use a planetary gear transmission.

In the conventional electric motor vehicles as indicated above, the power transmission line connecting the output shaft of the electric motor to the drive wheels includes such speed reducing gear device and a differential gear device, but does not include any means that can be used by the vehicle operator to disconnect the power transmission line, for example, to disconnect a speed reduction gear device from the electric motor. In the event of any abnormality such as locking of the electric motor due to any failure thereof, the drive wheels of the vehicle are also locked, causing difficult movement of the vehicle. In the event of an operating trouble such as reversal of the operating direction of the electric motor due to any abnormality of a control system for the motor, the procedure available for dealing with the trouble is limited to applying a brake to the vehicle to stop the vehicle or turning off the power switch.

SUMMARY OF THE INVENTION

It is therefore a principal object of the present invention to provide a drive system for an electric motor vehicle, equipped with a device for easily and reliably disconnecting a power transmission line coupled between the electric motor and the drive wheels, in the event of any abnormality associated with the electric motor.

The present invention is directed to a drive system for an electric motor vehicle which transmits a rotary motion of an electric motor to a drive wheel through a speed reducing device, at a predetermined speed reducing ratio. The drive system comprises: (a) clutch means for effecting connection and disconnection between the electric motor and the drive wheel, the clutch means having a connecting position for the connection and a disconnecting position for the disconnection; (b) a shift lever having at least a drive position and a neutral position; and (c) a clutch operating mechanism which operatively connects the shift lever and the clutch means, such that the clutch means is placed in the connecting and disconnecting positions when the shift lever is operated to the drive and neutral positions, respectively.

In the present drive system for an electric motor vehicle constructed according to the present invention as described, the clutch means is brought to the disconnecting position by means of the clutch operating mechanism when the shift lever is operated to the neutral position. Thus, the drive wheel is disconnected from the electric motor by operating the shift lever to the neutral position. This arrangement permits the operator of the vehicle to easily move the vehicle by disconnecting the drive wheel from the electric motor by operating the shift lever to the neutral position, in the event of locking of the electric motor due to some abnormality associated with the motor. Further, an abnormal running of the vehicle due to a trouble relating to the rotating condition of the electric motor can be readily dealt with by disconnecting the drive wheel from the electric motor with the shift lever operated to the neutral position.

Since the clutch means is mechanically linked to the shift lever by the clutch operating mechanism, the clutch means can be shifted between the connecting and disconnecting positions, with high reliability, even if the abnormality associated with the electric motor arises from a trouble or defect in the electrical system of the vehicle. If the clutch means were operated by an electrically operated actuator, for example, the drive wheel connected to the speed reducing device could not be disconnected from the electric motor if the abnormality of the electric motor is associated with the electrical system. Further, the utilization of the shift lever for controlling the clutch means eliminates the use of an exclusive operator-controlled member for the clutch means. Accordingly, the clutch means can be controlled with a comparatively high degree of ease, and the number of components required to control the clutch means is reduced.

The present drive system enables the vehicle operator to run the vehicle in a coasting mode with the shift lever operated to the neutral position during a normal running of the vehicle, namely, in a mode in which the power transmission line between the electric motor and the drive wheel is disconnected by the clutch means placed in the disconnecting position. Thus, the present drive system assures increased freedom of choice of the running mode of the vehicle.

In the coasting mode, the operating speed of the electric motor is usually zeroed with the accelerator pedal kept in the non-operated position. If the operator returns the shift lever to the drive position during running of the vehicle in this coasting mode, the clutch means suffers from a suddenly changing load upon shifting thereof to the connecting position, due to a large difference between the operating speeds of the speed reducing device and the electric motor. Therefore, the operation of the shift lever from the neutral position back to the drive position would increase the time required for the clutch means to complete its shifting to the connecting position, and cause the clutch means to receive a considerable shock.

The above drawback may be solved according to a preferred form of this invention, wherein the clutch means is disposed between the electric motor and an input member of the speed reducing device, and the drive system further comprises: (d) a shift position sensor for detecting an operation of the shift lever to the neutral position; (e) first speed sensing means for detecting a speed of the electric motor; (f) second speed sensing means for detecting a speed of the speed reducing device; and (g) synchronizing means, operable when the operation of the shift lever to the neutral position is detected by the shift position sensor, for controlling the electric motor on the basis of outputs of the first and second speed sensing means, such that the speed of the electric motor and a rotating speed of the input member of the speed reducing device substantially coincide with each other while the shift lever is placed in the neutral position.

The above form of the invention permits the shift lever to be easily operated from the drive position to the neutral position during coasting of the vehicle, and also assures shock-free shifting of the clutch means to the connecting position in a relatively short length of time. Further, the shock-free shifting of the clutch means results in increasing its service life and makes it possible to reduce the size of the clutch means.

According to another preferred form of the present invention, a linkage connecting the shift lever to a lock mechanism for locking the speed reducing device is utilized as the clutch operating mechanism. More specifically, the drive wheel of the vehicle can be locked by locking the speed reducing device by operating the shift lever to a parking position. In this arrangement, the linkage in question may include a first engaging portion engageable with a shift fork to move the shift fork and thereby shift the clutch means to the disconnecting position when the shift lever is operated to the neutral position, and a second engaging portion engageable with the lock mechanism to lock the speed reducing device when the shift lever is moved to the parking position.

Although the difference of the operating speeds of the electric motor and the input member of the speed reducing device is reduced by the synchronizing means described above, a synchronizer ring is preferably incorporated in the clutch means, to minimize the shifting shock of the clutch means upon shifting thereof from its disconnecting position to its connecting position.

The synchronizing means may be adapted to determine a torque adjusting amount while the shift lever is placed in the neutral position, such that the torque adjusting amount changes with a difference between the speeds of the electric motor and the input member of the speed reducing device, and determine a target torque of the electric motor on the basis of the determined torque adjusting amount while the shift lever is in the neutral position. This arrangement suitably controls the speed of the electric motor so as to eventually coincide with the speed of the input member of the speed reducing device.

According to a further preferred form of the present invention, the drive system further includes an actuator for shifting the clutch means to the disconnecting position, and control means for activating the actuator to shift the clutch means to the disconnecting position, when an abnormal operating condition of the electric motor is detected during running of the vehicle. For example, the control means comprises detecting means for detecting an abnormal rise of the speed of the electric motor above a predetermined upper limit. This arrangement automatically activates the actuator to shift the clutch means to the disconnecting position, in the event the control means detects any abnormal operating condtiion of the motor. The shift lever having the neutral position and the actuator automatically activated by the control means provide manual and automatic devices for assuring safety of operation of the electric motor vehicle.

The actuator provided in the above form of the invention may be associated with the clutch operating mechanism to operate the clutch operating mechanism to shift the clutch means to the disconnecting position when the actuator is automatically activated by the control means.

BRIEF DESCRIPTION OF THE DRAWINGS

The above and other objects, features and advantages of the present invention will be better understood by reading the following detailed description of presently referred embodiments of the invention, when considered in connection with the accompanying drawings, in which.

DETAILED DESCRIPTION OF THE PREFERRED EMBODIMENT

Figure 1:
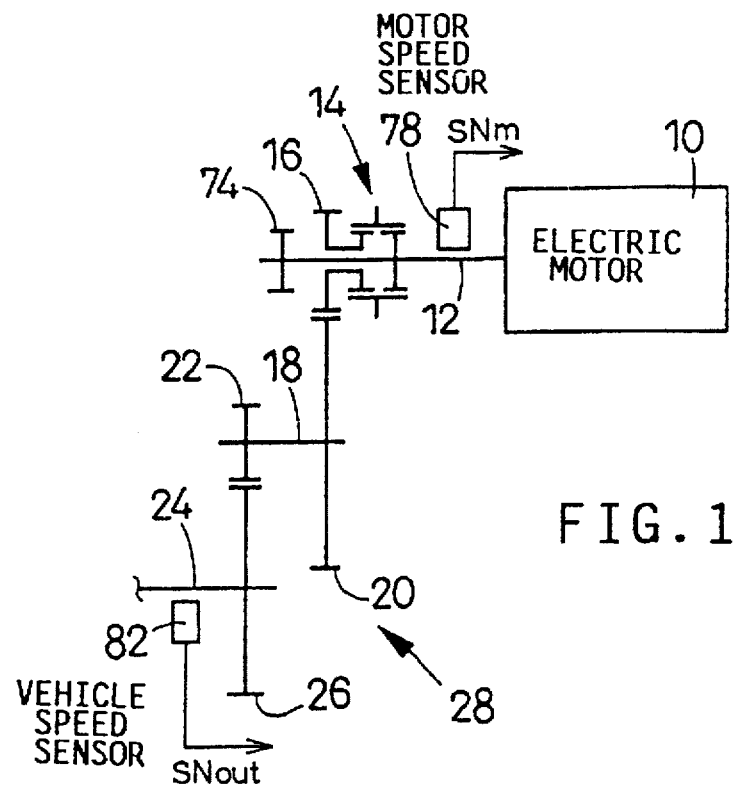
FIG. 1 is a schematic diagram illustrating a part of a drive system for an electric motor vehicle, which includes a clutch between an electric motor and a speed reducing device, according to one embodiment of this invention.

Referring first to the schematic diagram of FIG. 1, a shaft 12 of an electric motor 10 of an electric motor vehicle is adapted to be connected to and disconnected from a first small-diameter gear 16 of a speed reducing device 28, through clutch means in the form of a clutch 14 equipped with a synchronizing mechanism. As described below, the first small-diameter gear 16 is rotatably supported on the motor shaft 12. The first small-diameter gear 16 serves as an input member of the speed reducing device 28.

The first small-diameter gear 16 meshes with a first large-diameter gear 20 fixedly supported on an intermediate shaft 18. This shaft 18 also has a second small-diameter gear 22 fixed thereto and meshing with a second large-diameter gear 26 fixedly supported on an output shaft 24 of the speed reducing device 28. The second large-diameter gear 26 serves as an output member of the device 28.

The speed reducing device 28 which includes a train of gears 16, 20, 22 and 26 described above has a predetermined speed reduction ratio "i" which is equal to Nin/Nout, where Nin represents the rotating speed of the input member 16, while Nout represents the rotating speed of the output member 26 or output shaft 24. With the electric motor 10 operatively connected to the thus constructed speed reducing device 28 via the clutch 14, a rotary motion of the electric motor 10 is transmitted to a pair of drive wheels of the electric motor vehicle, at the speed reduction ratio "i", through the output shaft 24, a differential gear device and other components as well known in the art.

As is apparent from the above description, the speed reducing device 28 is of a three-axis type having the three parallel shafts 12, 18, 24. The electric motor 10 may be a permanent magnet type AC motor, an induction motor, a DC motor, or any other type of electric motor, as used on the conventional electromobiles.

Figure 2:
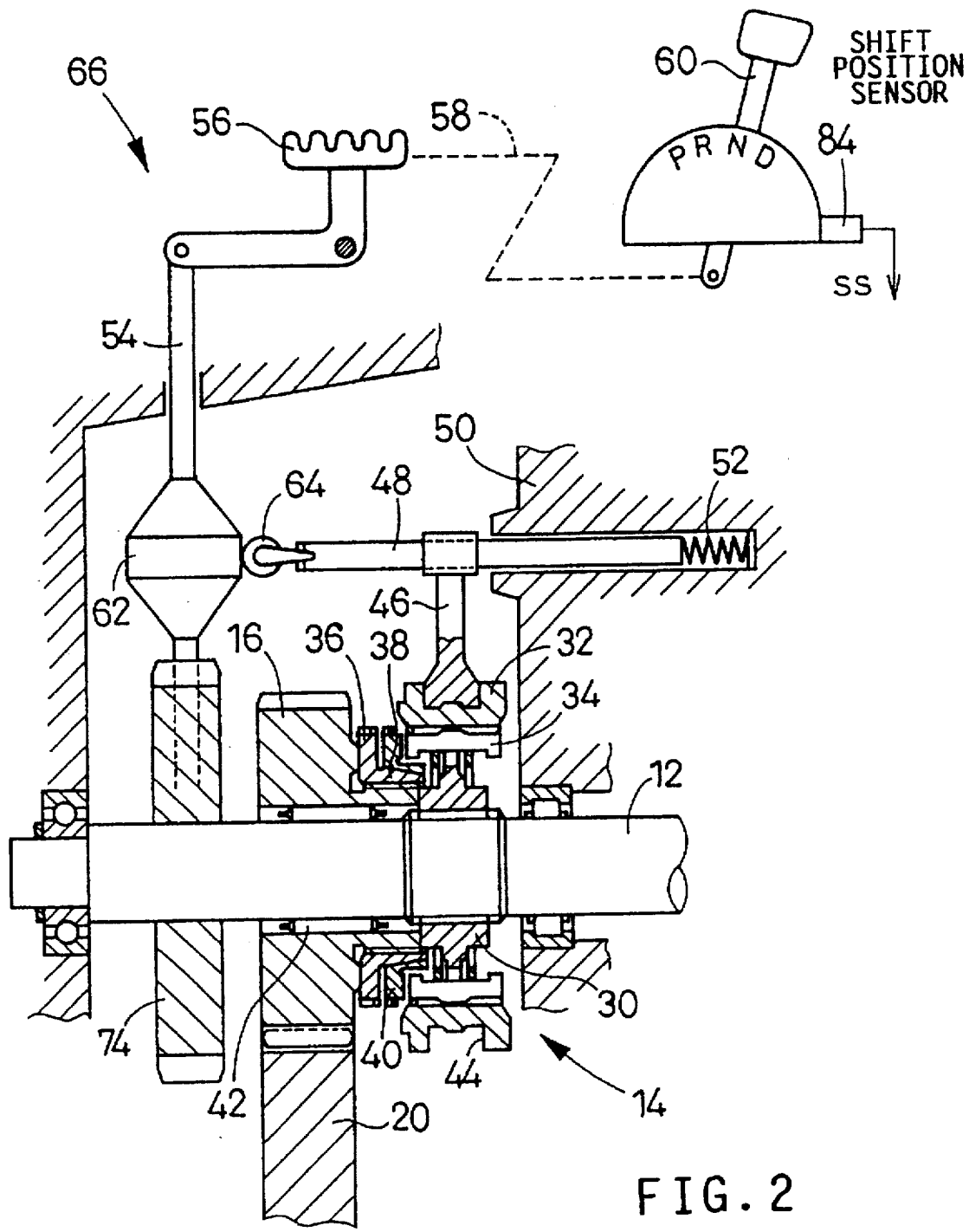
FIG. 2 is a fragmentary view in cross section showing the clutch used in the drive system of FIG. 1, and a mechanism for operating the clutch.

Referring next to FIG. 2, there will be described the clutch 14 in detail. The clutch 14 includes a clutch hub 30, a sleeve 32, a plurality of shifting keys 34, a clutch gear 36, a synchronizer ring 40 and a bearing 42. The clutch hub 30 is splined to the motor shaft 12, and the sleeve 32 is splined to a radially outer portion of the clutch hub 30. The shifting keys 34 are fitted in respective grooves formed in the outer circumferential surface of the clutch hub 30 such that the grooves are spaced apart from each other in the circumferential direction of the hub 32. The shifting keys 34 are spring-biased against the inner circumferential surface of the sleeve 32. The synchronizer ring 40 engages the shifting keys 34 so as to permit a limited angle of relative rotation therebetween, and is fitted on an outer circumferential surface of a tapered portion 38 of the clutch gear 36 such that the ring 40 is rotatable relative to the clutch gear 36. The clutch gear 36 is splined to the first small-diameter gear or input member 16, which is mounted on the motor shaft 12 via the bearing 42 such that the gear 16 is rotatable relative to the shaft 12.

The clutch 14 has a disconnecting position as indicated in FIG. 2 in which the sleeve 32 engages only the clutch hub 30, and a connecting position in which the sleeve 32 engages the clutch gear 36 as well as the clutch hub 30. In the disconnecting position, the first small-diameter gear 16 is disconnected from the motor shaft 12, whereby the speed reducing device 28 is disconnected from the electric motor 10. When the sleeve 32 is shifted to the left from the position of FIG. 2, the clutch 14 is placed in the connecting position in which the first small-diameter gear 16 is connected to the motor shaft 12, whereby the speed reducing device 28 is connected to the electric motor 10 so that the rotary motion of the motor 10 is transmitted to the speed reducing device 28 through the clutch 14.

When the clutch 14 is shifted from the disconnecting position of FIG. 2 to the connecting position, the synchronizer ring 40 frictionally engages the tapered portion 38 of the clutch gear 36, so as to permit synchronous rotation of the clutch gear 36 and the motor shaft 12. The synchronizer ring 40 thus permits smooth engagement of the sleeve 32 with the clutch gear 36, even if there exists an initial speed difference between the motor shaft 12 and the small-diameter gear 16.

The sleeve 32 has an annular groove 44 formed in its outer circumferential surface. The annular groove 44 engages an end portion of a shift fork 46 so that the sleeve 32 is rotated in sliding contact with and relative to the shift fork 46. The motor shaft 12 is rotatably supported by a housing 50. A shift fork 46 which carries the shift fork 48 fixed thereto is supported by the housing 50 such that the shift rod 48 extends parallel to the motor shaft 12 and is movable in its longitudinal direction relative to the housing 50 and the clutch 14. With the shift rod 48 moved in the longitudinal direction, the shift fork 46 engaging the sleeve 32 of the clutch 14 is moved right and left, whereby the clutch 14 is shifted between the disconnecting and connecting positions. The shift rod 48 is biased by a spring 52 in the leftward direction, so that the clutch 14 is biased leftward, that is, toward its connecting position.

The electric motor vehicle is equipped with a shift lever 60 which has a PARKING position P, a REVERSE position R, a NEUTRAL position N and a DRIVE position D. The shift lever 60 is operated to the PARKING position P when the vehicle is parked with the speed reducing device 28 placed in a locked state as described below. The shift lever 60 is operated to the REVERSE position R when the vehicle is run in the reverse or backward direction. To disconnect the drive wheels of the vehicle from the electric motor 12, the shift lever 60 is operated to the NEUTRAL position N as discussed below in detail. The shift lever 60 is operated to the DRIVE position D when the vehicle is run in the forward direction.

The motor vehicle is also equipped with a mechanism for locking the speed reducing device 28 and thereby locking the drive wheels when the vehicle is parked. This mechanism uses a parking lock rod 54 which extends in a direction perpendicular to the longitudinal direction of the shift rod 48. This lock rod 54 is supported by the housing 50 movably in the longitudinal direction, and is connected at one end thereof to a lever 56, which in turn is operatively connected to the shift lever 60 by a cable 58. When the shift lever 60 is operated, the lock rod 54 is moved in the longitudinal direction.

A longitudinally intermediate portion of the lock rod 54 provides a first engaging portion in the form of a shift cam 62. On the other hand, the shift rod 48 has a cam follower in the form of a roll 64 rotatably supported at its end remote from the spring 52. When the shift lever 60 is operated to the NEUTRAL position N, the shift cam 62 of the lock rod 54 is brought into engagement with the cam follower roll 64, thereby moving the shift rod 48 together with the shift fork 56 against the biasing action of the spring 52, whereby the sleeve 32 of the clutch 14 is disengaged from the clutch gear 36. Thus, the clutch 14 is shifted to the disconnecting position of FIG. 2 for disconnecting the speed reducing device 28 from the electric motor 10, when the shift lever 60 is operated to the NEUTRAL position N.

When the shift lever 60 is placed in the DRIVE, REVERSE or PARKING position D, R, P, the shift cam 62 on the lock rod 54 is not engaged with the cam follower roll 64 of the shift rod 48, whereby the clutch 14 is held in the connecting position under the biasing force of the spring 52 acting on the shift rod 48.

It will be understood from the above explanation of the present embodiment that the shift fork 46, shift rod 48 with the cam follower roll 64, spring 52, parking lock rod 54 with the shift cam 62, lever 56, and cable 58 cooperate to provide a clutch operating mechanism indicated generally at 66 in FIG. 2, which operatively connects the shift lever 60 to the clutch 14 for shifting the clutch 14 to the connecting and disconnecting positions when the shift lever 60 is operated to the DRIVE position D and the NEUTRAL position N, respectively.

Figure 3:
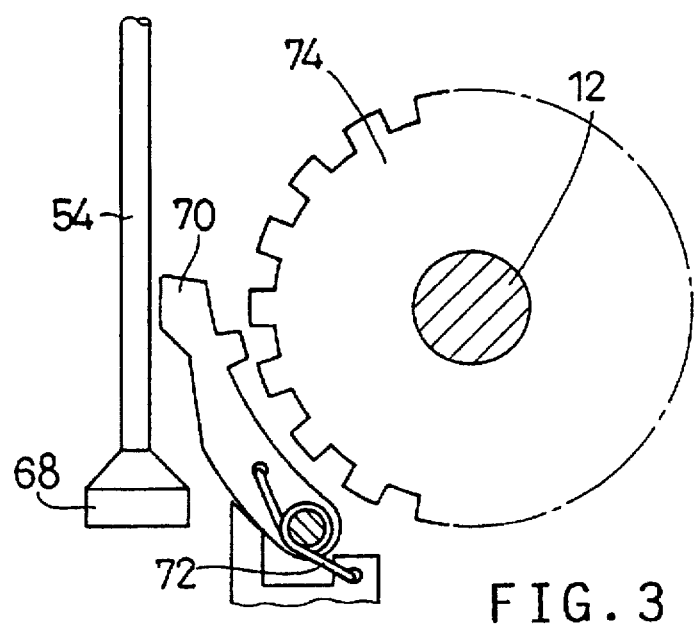
FIG. 3 is an elevational view showing a parking rock mechanism provided in the drive system of FIG. 1.

The lock mechanism for locking the speed reducing device 28 as indicated above is operated by a lock cam 68 which is provided at the end of the lock rod 54 remote from the lever 56. This lock cam 68 is provided as a second engaging portion of the lock rod 54, which is engageable with a parking lock pawl 70 of the lock mechanism as shown in FIG. 3 when the shift lever 60 is operated to the PARKING position P. The lock mechanism includes the lock pawl 70, a torsion spring 72, and a parking lock gear 74 fixed to the motor shaft 12. The lock pawl 70 is pivotally supported at one end thereof and is normally spaced apart from the lock gear 74 under the biasing force of the torsion spring 72, to thereby permit rotation of the motor shaft 12. When the lock cam 68 is moved upward with the upward movement of the lock rod 54 upon operation of the shift lever 60 to the PARKING position P, the lock cam 68 is brought into engagement with the lock pawl 70, whereby the lock pawl 70 is pivoted against the biasing action of the spring 72, for locking engagement with the lock gear 74.

Thus, the motor shaft 12 is mechanically locked by the lock mechanism 70, 72, 74 through the clutch operating mechanism 66 when the shift lever 60 is operated to the PARKING position P. Since the clutch 14 is placed in the connecting position when the shift lever 60 is in the PARKING position P, the locking of the motor shaft 12 results in locking the speed reducing device 28 and therefore locking the drive wheels of the vehicle. It will be understood that the mechanism 66 is used to operate both the clutch 14 and the lock mechanism 70, 72, 74.

Figure 4:
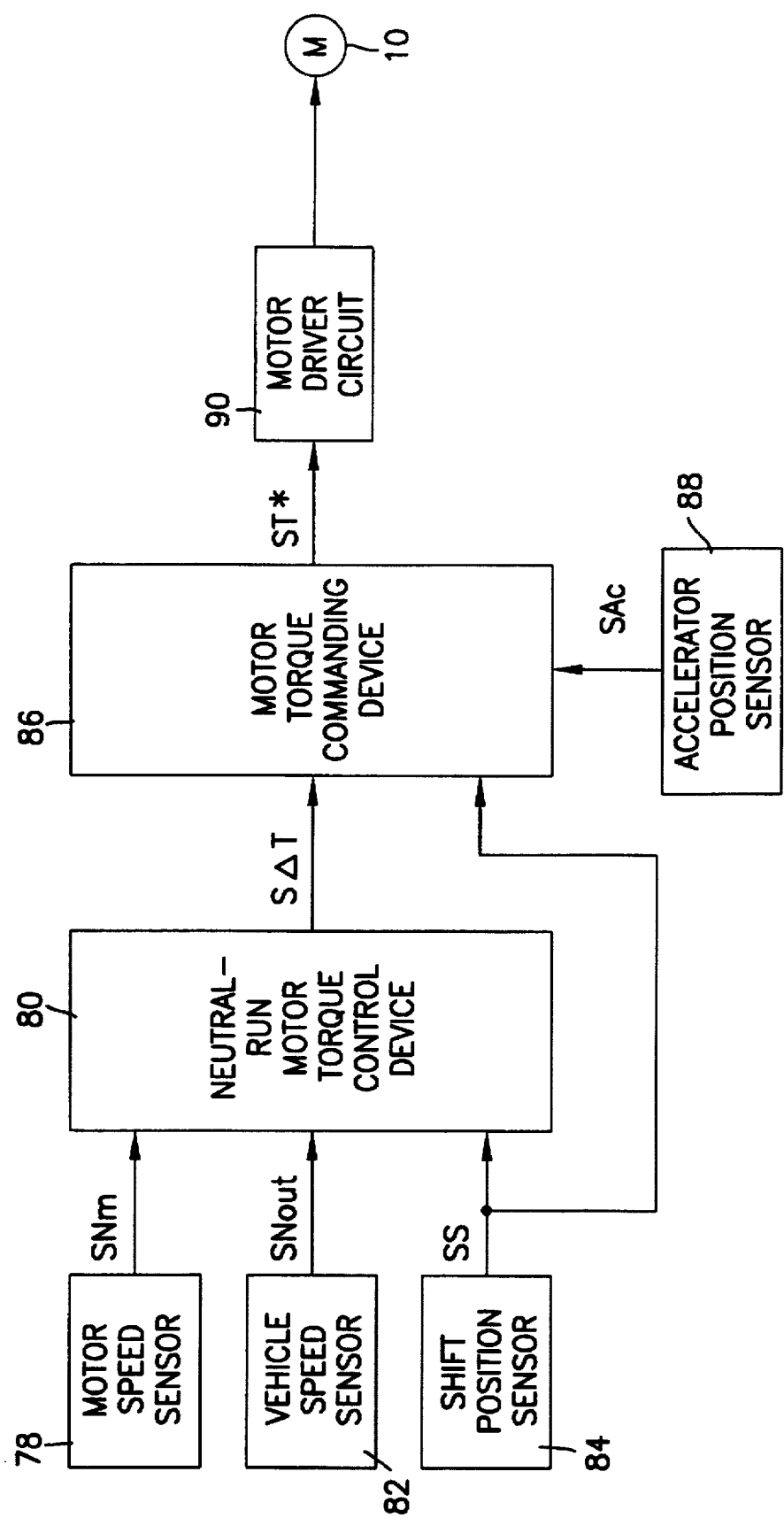
FIG. 4 is a block diagram illustrating a control system for controlling the electric motor of the drive system of FIG. 1.

The present drive system for the electric motor vehicle uses a control system as illustrated in FIG. 4. The control system includes a neutral-run motor torque control device 80, a motor torque commanding device 86 and a motor driver circuit 90, the functions of which will be described. The control system further includes first speed sensing means in the form of a motor speed sensor 78 which generates a MOTOR SPEED signal SNm indicative of a rotating speed Nm of the motor shaft 12. The signal SNm is applied to the neutral-run motor torque control device 80. The control system also includes second speed detecting means in the form of a vehicle speed sensor 82 which generates a VEHICLE SPEED signal SNout indicative of the rotating speed Nout of the output shaft 24, and a shift position sensor 84 which generates a SHIFT POSITION signal SS indicative of the currently selected position of the shift lever 60. The VEHICLE SPEED signal SNout is also applied to the neutral-run motor torque control device 80 and the motor torque commanding device 86. The motor speed sensor 78 and the vehicle speed sensor 82 may use an optical pulse generator, for example. An accelerator position sensor 88 is provided to detect an operating amount Ac of an accelerator pedal provided on the vehicle. This sensor 88 generates an ACCELERATOR signal Aac, which is applied to the motor torque commanding device 86.

Each of the neutral-run motor torque control device 80 and the motor torque commanding device 86 is constituted principally by a microcomputer which incorporates a central processing unit, a random-access memory, a read-only memory and input and output interface circuits. The neutral-run motor torque control device 80 operates to execute a control routine illustrated in the flow chart of FIG. 5 to determine a torque adjusting amount $\Delta T$, while the motor torque commanding device 86 operates to execute a control routine illustrated in the flow chart of FIG. 6 to determine a target torque T* of the electric motor 10. The control programs representative of the above control routines are stored in the read-only memories of the control and commanding devices 80, 86. The control device 80 and the commanding device 86 execute the respective control routines while utilizing a temporary data storage function of their random-access memories.

A TORQUE ADJUSTMENT signal SΔT indicative of the torque adjusting amount $\Delta T$ is fed from the neutral-run motor torque control device 80 to the motor torque commanding device 86, and a TARGET TORQUE signal ST* indicative of the target torque T* is fed from the commanding device 86 to the motor driver circuit 90. The voltage or frequency of the drive signal applied to the electric motor 10 is controlled by the motor driver circuit 90 so that the actual torque of the motor 10 coincides with the target torque T*. The control routines of FIGS. 5 and 6 are executed with a cycle time of about 8–32 msecs.

The torque adjusting amount $\Delta T$ is determined by the neutral-run motor torque control device 80 so that the determined torque adjusting amount $\Delta T$ will affect the desired or target torque T* of the motor 10 so as to control the rotating speed Nm of the motor shaft 12 to be almost equal to the rotating speed Nin of the input member or first small-diameter gear 16 of the speed reducing device 28, while the shift lever 60 is placed in the NEUTRAL position N. In other words, the torque adjusting amount $\Delta T$ is determined during running of the vehicle in the coasting mode with the clutch 14 placed in the disconnecting position for disconnection of the speed reducing device 28 from the electric motor 10, so that the rotating speed Nm of the motor shaft 12 is made substantially equal to the rotating speed Nin of the input member 16 of the speed reducing device 28 before the shift lever 60 is operated from the NEUTRAL position N back to the DRIVE position D to bring the clutch 14 to the connecting position. By controlling the electric motor 10 according to the target torque T* determined by the motor torque commanding device 86 on the basis of the thus determined torque adjusting amount $\Delta T$, the clutch 14 can be smoothly shifted to the connecting position with reduced shifting shock when the shift lever 60 once operated to the NEUTRAL position N during coasting of the vehicle is returned to the DRIVE position D.

The control routine executed by the neutral-run motor torque control device 80 to determine the torque adjusting amount $\Delta T$ will be described by reference to the flow chart of FIG. 5.

Figure 5:
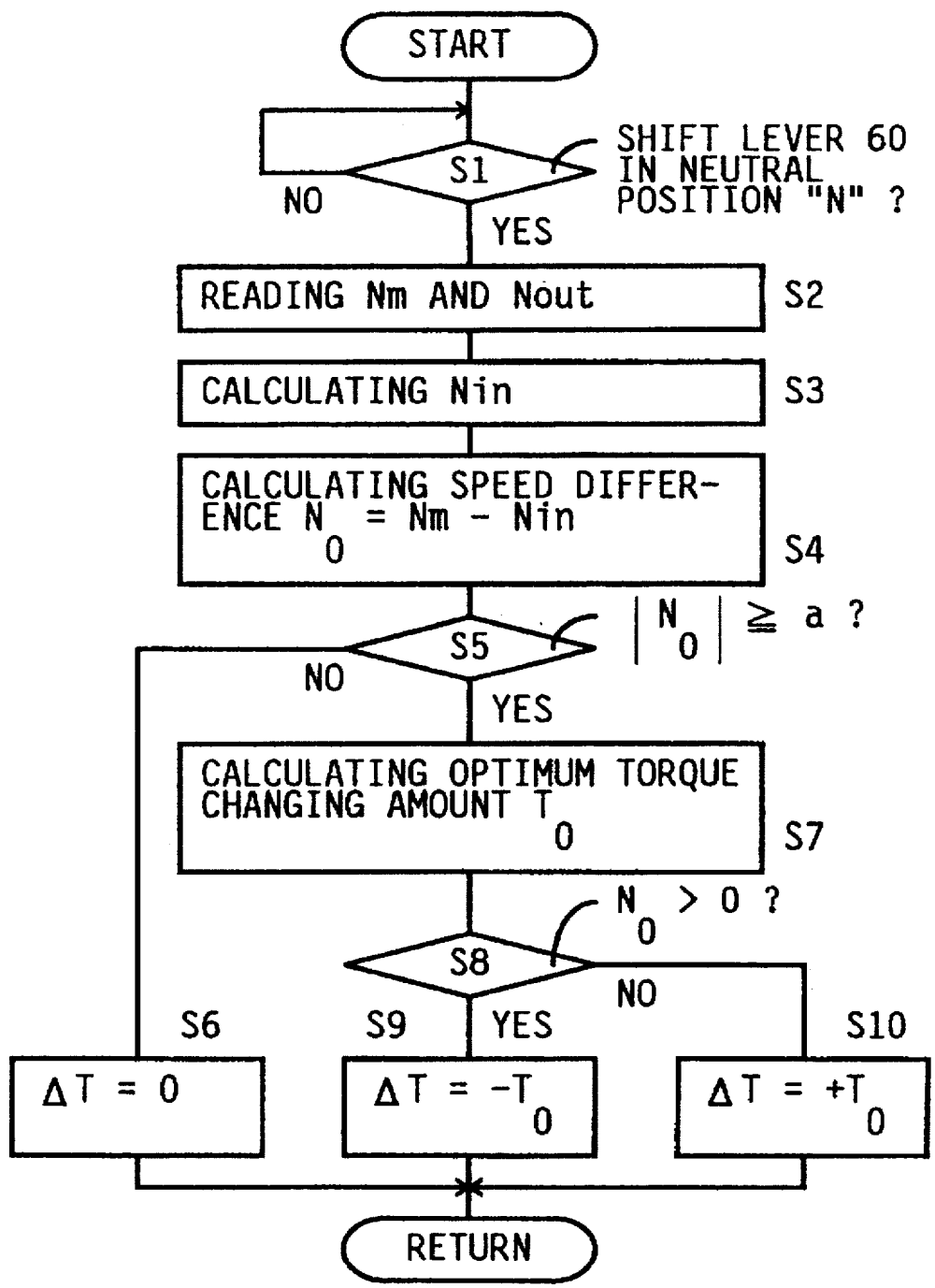
FIG. 5 is a flow chart illustrating a control routine executed by a neutral-run motor torque control device incorporated in the control system of FIG. 4 to determine a torque adjusting amount ΔT.
Figure 6:
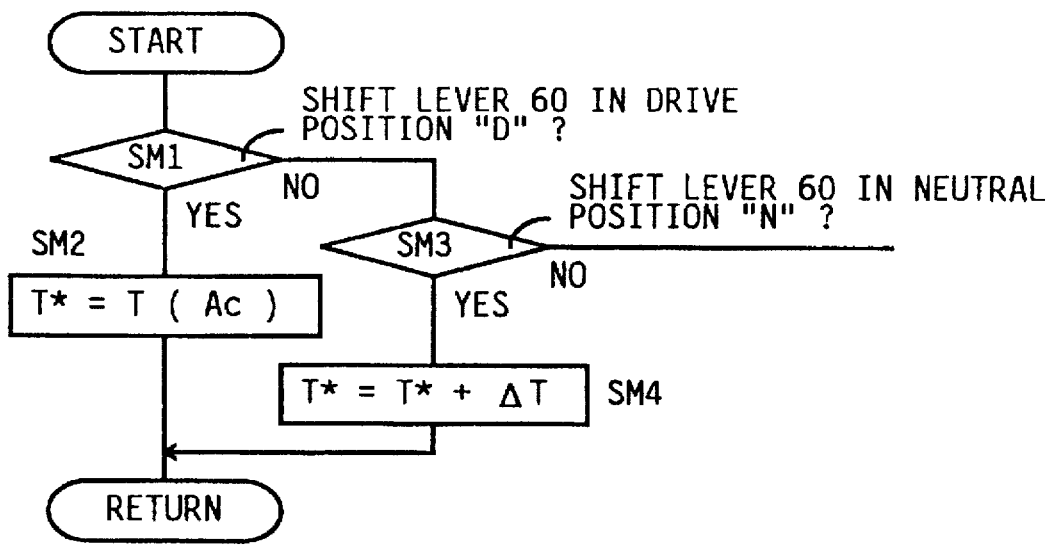
FIG. 6 is a flow chart illustrating a control routine executed by a motor torque commanding device also incorporated in the control system of FIG. 4 to control the torque of the electric motor.

The control routine of FIG. 5 is initiated with step S1 to determine, on the basis of the SHIFT POSITION signal SS, whether the shift lever 60 is currently placed in the NEUTRAL position N. If the shift lever 60 is placed in a position other than the NEUTRAL position N, a negative decision (NO) is obtained in step S1, and this step S1 is repeatedly implemented until the shift lever 60 is operated to the NEUTRAL position N. If the NEUTRAL position N is selected to shift the clutch 14 to its disconnecting position for disconnecting the speed reducing device 28 from the electric motor 10, the control flow goes to step 2 and the following steps.

Step S2 is provided to determine the speed Nm of the motor shaft 12 and the speed Nout of the output shaft 24, on the basis of the MOTOR SPEED signal SNm and VEHICLE SPEED signal SNout. Step S2 is followed by step S3 to calculate the speed Nin of the speed Nin of the input member 16 of the speed reducing member 28, by multiplying the speed Nout by the speed reduction ratio "i" of the speed reducing device 28. The control flow then goes to step S4 to calculate a difference $N_0 = Nm - Nin$ between the speeds Nm and Nin. Step S4 is followed by step S5 to determine whether an absolute value $|N_0|$ of the difference $N_0$ is equal to or larger than a predetermined threshold value "a". This comparison of the absolute value $|N_0|$ with the threshold value "a" is effected to determine whether the absolute value $|N_0|$ is small enough to permit the clutch 14 to be smoothly shifted to the connecting position. If the absolute value $|N_0|$ is smaller than the threshold value "a", it is not necessary to change the current speed Nm of the motor 10. In this case, therefore, the control goes to step S6 in which the torque adjusting amount ΔT is determined to be zero (0). The TORQUE ADJUSTMENT signal indicative of the thus determined torque adjusting amount ΔT=0 is fed from the neutral-run motor torque control device 80 to the motor torque commanding device 86.

Figure 7:
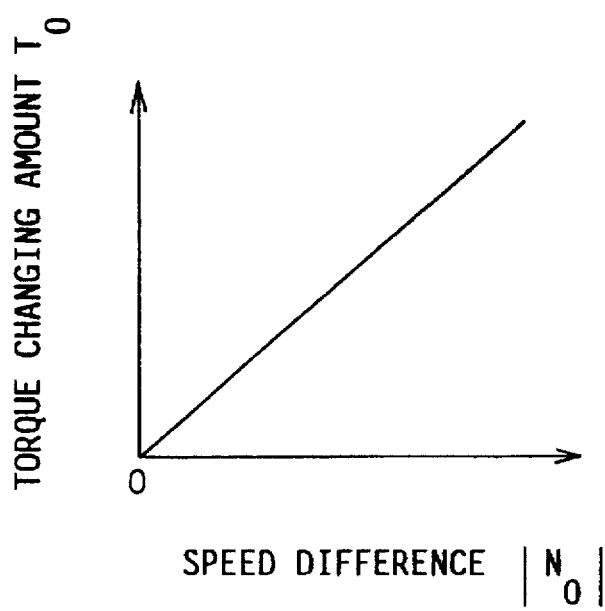
FIG. 7 is a graph indicating an example of a data map used in step S7 of the flow chart of FIG. 5 for calculating an torque changing amount $T_0$ for determining the torque adjusting amount ΔT used in the control routine of FIG. 6.

If an affirmative decision (YES) is obtained in step S5, namely, if the absolute value $|N_0|$ of the difference $N_0$ is equal to or larger than the threshold value "a", it is necessary to change the speed Nm of the motor 10 for facilitating the shifting of the clutch 14 to its connecting position. To this end, step S7 is implemented to calculate an optimum torque changing amount $T_0$, as a function of the absolute speed difference $|N_0|$, according to a suitable data map or an equation representative of a relationship between the optimum torque changing amount $T_0$ and the absolute speed difference $|N_0|$. For instance, a relationship as indicated in the graph of FIG. 7 is used to calculate the optimum torque changing amount $T_0$. According to this relationship, the optimum torque changing amount $T_0$ increases with an increase in the absolute speed difference $|N_0|$.

Step S7 is followed by step S8 to determine whether the speed difference $N_0$ is a positive value or a negative value. If the speed difference $N_0$ is a positive value, that is, if the speed Nm of the motor 10 is higher than the speed Nin of the input member 16 of the speed reducing device 28, the control flow goes to step S9 in which the torque adjusting amount ΔT is determined to be $-T_0$ in order to lower the speed Nm of the motor 10. The TORQUE ADJUSTMENT signal SΔT indicative of the determined torque adjusting amount ΔT is fed from the control device 80 to the commanding device 86. If, on the other hand, the speed difference $N_0$ is a negative value, that is, if the speed Nm of the motor 10 is lower than the speed Nin of the input member 16, the control flow goes to step S10 in which the torque adjusting amount ΔT is determined to be $+T_0$ in order to raise the speed Nm of the motor 10. The TORQUE ADJUSTMENT signal SΔT indicative of the determined torque adjusting amount ΔT is fed from the control device 80 to the commanding device 86.

The motor torque commanding device 86 is adapted to determine the target torque T* of the electric motor 10, and applies the TARGET TORQUE signal ST* indicative of the determined target torque T* to the motor driver circuit 90, to control the electric motor 10 so that the output torque of the motor 10 coincides with the target torque T*. The control routine of FIG. 6 executed by this commanding device 86 is initiated with step SM1 to determine whether the shift lever 60 is currently placed in the DRIVE position D. When the shift lever 60 is in the DRIVE position D, step SM2 is implemented to calculate the target torque T* as a function of the operating amount Ac of the accelerator pedal represented by the ACCELERATOR signal SAc, according to a suitable data map or equation representative of a predetermined relationship between the operating amount Ac and the target torque T*. The TARGET TORQUE signal ST* indicative of the calculated target torque T* is applied to the motor driver circuit 90.

When the shift lever 60 is not placed in the DRIVE position D, the control flow goes to step SM3 to determine whether the shift lever 60 is placed in the NEUTRAL position N. When the shift lever 60 is in the NEUTRAL position N, that is, if the clutch 14 is placed in the disconnecting position for disconnection of the speed reducing device 28 from the electric motor 10, step SM4 is implemented to calculate the target torque T* by adding to the currently effective target torque value T* the torque adjusting amount ΔT represented by the TORQUE ADJUSTMENT signal SΔT received from the control device 80. Thus, the target torque T* is adjusted by the commanding device 86, on the basis of the torque adjusting amount ΔT determined by the control device 80. The TARGET TORQUE signal ST* representative of the thus adjusted target torque T* is applied to the motor control circuit 90.

It will be understood that the electric motor 10 is controlled even while the clutch 14 is in the disconnecting position with the shift lever 60 placed in the NEUTRAL position N. More specifically, the output torque of the motor 10 while the shift lever 60 is in the NEUTRAL position N is controlled in response to the speed Nout of the output shaft 24 or output member 26 of the speed reducing device 28, which is proportional to the vehicle running speed, so that the speed Nm of the motor 10 substantially coincides with the speed Nin of the input member 16 of the speed reducing device 28.

It is noted that the ACCELERATOR signal SAc is not used in step SM4 to adjust the target torque T*. That is, the target torque value T* to which the torque adjusting amount ΔT is added to adjust the target torque T* is the value which was obtained from the accelerator operating amount Ac in the last cycle while the shift lever 60 was placed in the DRIVE position D.

Figure 8:
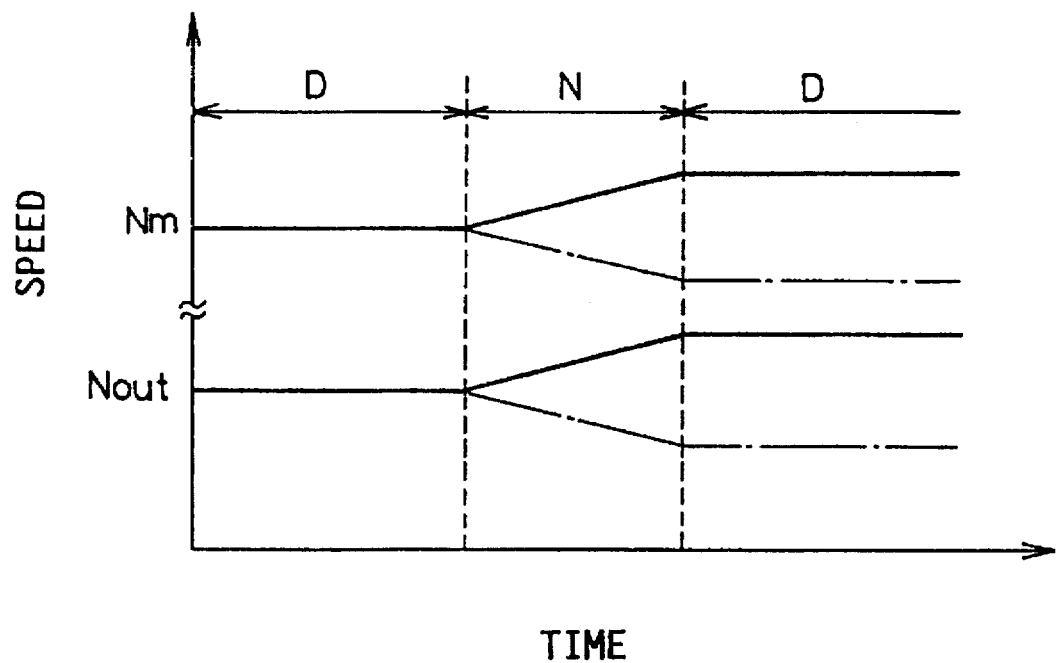
FIG. 8 is a graph depicting changes in output shaft speeds Nm of the electric motor and speed reducing device of FIG. 1, when the position of a shift lever of the vehicle is changed from DRIVE to NEUTRAL and then from NEUTRAL back to DRIVE.

Referring to the graph of FIG. 8, there are illustrated changes in the speed Nm of the motor 10 and the speed Nout of the output shaft 24 of the speed reducing device 28, in the case where the shift lever 60 is first operated from the DRIVE position D to the NEUTRAL position N during running of the vehicle in the DRIVE position D, and then operated back to the DRIVE position D. In FIG. 8, solid lines indicate the case where the output speed Nout of the speed reducing device 28 is raised when the vehicle runs on a downhill road, while one-dot chain lines indicate the case where the output speed Nout is lowered when the vehicle runs on a level or uphill road. In either of these cases, the output torque of the motor 10 during running of the vehicle with the shift lever 60 placed in the NEUTRAL position N is controlled based on the output speed Nout of the speed reducing device 28 so that the speed Nm of the motor 10 is substantially equal to the input speed Nin of the speed reducing device 28, namely, so that the speeds Nm and Nout are almost synchronized. Accordingly, the clutch 14 can be smoothly shifted to its connecting position when the shift lever 60 is returned to the DRIVE position D.

It will be understood from the above explanation that the neutral-run motor torque control device 80 executing the control routine S1–S10 of FIG. 5, and the portion of the motor torque commanding device 86 assigned to implement steps SM3 and SM4 of the control routine of FIG. 6 cooperate to constitute synchronizing means for controlling the electric motor 10 during running of the vehicle with the shift lever 60 placed in the NEUTRAL position N, on the basis of the speeds Nm and Nout, such that the speed Nm of the motor 10 substantially coincides with the speed Nin of the input member 16 of the speed reducing device 28.

In the electric motor vehicle having the drive system constructed as described above, an operation of the shift lever 60 to the NEUTRAL position N will cause the clutch 14 to be shifted to the disconnecting position, thereby disconnecting the speed reducing device 28 from the electric motor 10. Therefore, in the event of locking of the electric motor 10 due to some abnormality associated therewith, the vehicle can be easily moved by operating the shift lever 60 to the NEUTRAL position N to thereby disconnect the power transmission line between the motor 10 and the drive wheels. Further, the present arrangement permits the operator to deal with abnormal running of the vehicle due to abnormal operating condition of the motor 10 such as reversal of the rotating direction, which would take place due to a trouble with the control device for the motor. That is, such abnormal running of the vehicle can be dealt with by operating the shift lever 60 to the NEUTRAL position N to disconnect the drive wheels from the electric motor 10.

In the illustrated embodiment, the clutch 14 is mechanically linked to the shift lever 60 through the clutch operating mechanism 66. This arrangement assures reliable shifting of the clutch 14 between the connecting and disconnecting positions, even if the abnormality associated with the electric motor arises from a trouble or defect in the electrical system of the vehicle. If the clutch 14 were operated by an electrically operated actuator, for example, the drive wheels connected to the speed reducing device 28 could not be disconnected from the electric motor if the abnormality of the electric motor is associated with the electrical system. Further, the utilization of the shift lever 60 for controlling the clutch 14 eliminates the use of an exclusive operator-controlled member for the clutch 14. Accordingly, the clutch 14 can be controlled comparatively easily, and the number of components required to control the clutch 14 is reduced.

The present drive system enables the vehicle operator to run the vehicle in a coasting mode with the shift lever 60 operated to the NEUTRAL position N during a normal running of the vehicle in the DRIVE position D. In other words, the vehicle operator may select a vehicle running mode in which the power transmission line between the electric motor 10 and the drive wheels is disconnected by the clutch 14s placed in the disconnecting position. Thus, the present drive system assures increased freedom of choice of the running mode of the vehicle. Moreover, the present drive system is adapted such that when the shift lever 60 is in the NEUTRAL position N, the output torque of the electric motor 10 is controlled in response to a change in the output speed Nout of the speed reducing device 28, such that the speed Nm of the electric motor 10 and the input speed Nin of the the speed reducing device 28 substantially coincide with each other while the shift lever 60 is placed in the NEUTRAL position N. This arrangement permits the shift lever 60 to be easily operated from the DRIVE position D to the NEUTRAL position N during coasting of the vehicle, with shock-free shifting of the clutch 14 to the connecting position in a relatively short time. Further, the shock-free shifting of the clutch 14 results in increasing its service life and makes it possible to reduce the size of the clutch 14.

Figure 9:
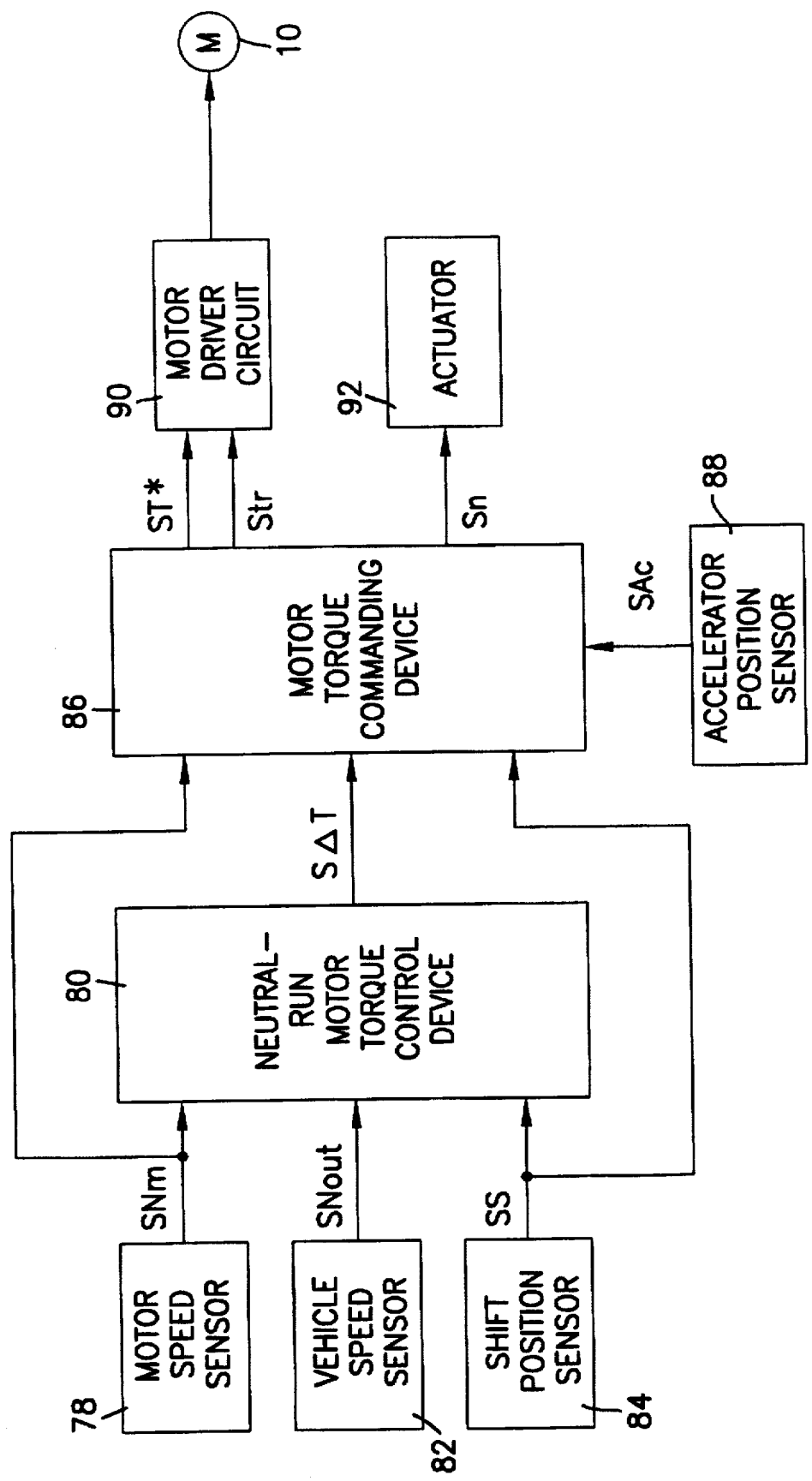
FIG. 9 is a block diagram illustrating a control system for the drive system of FIG. 1, which is used in a second embodiment of this invention.
Figure 10:
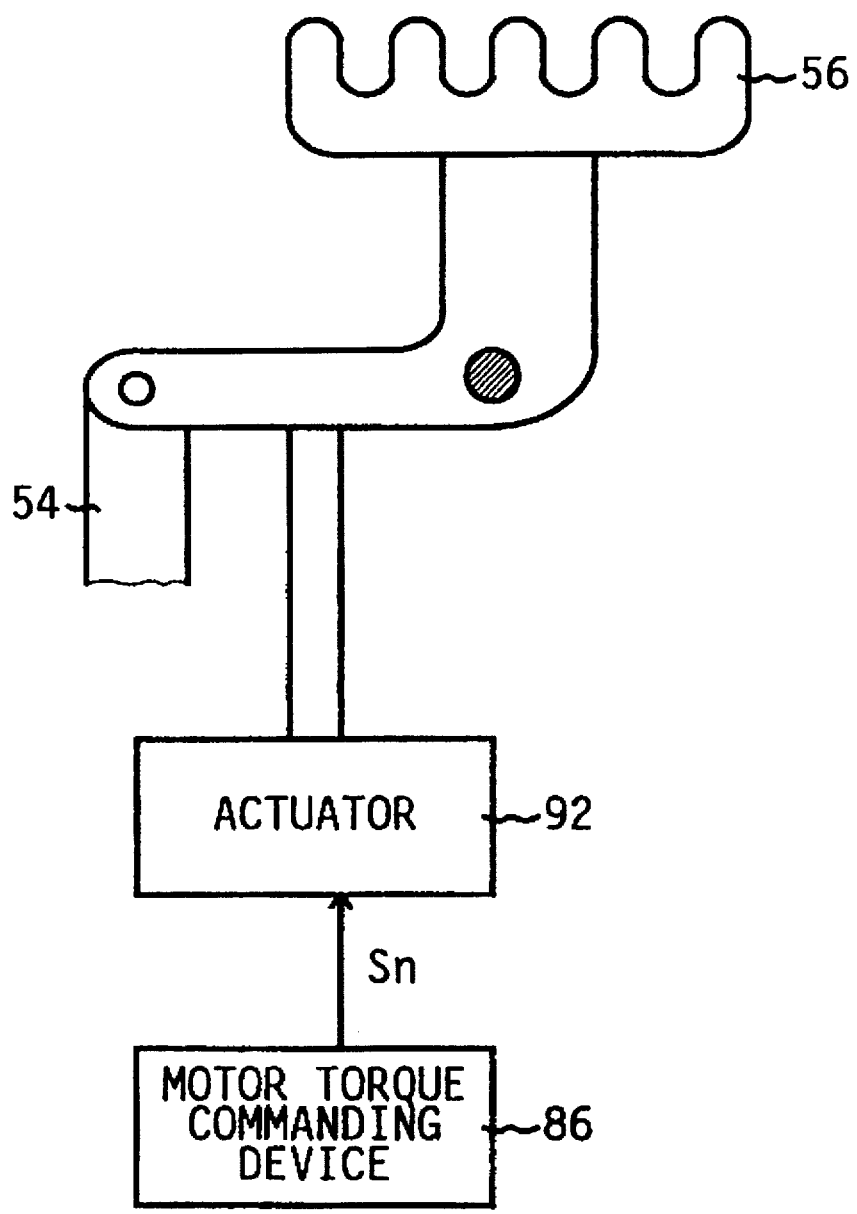
FIG. 10 is a schematic view illustrating an actuator provided in the second embodiment, which is energized to shift the clutch to the disconnecting position when the control system of FIG. 9 detects an abnormally high speed of the electric motor.
Figure 11:
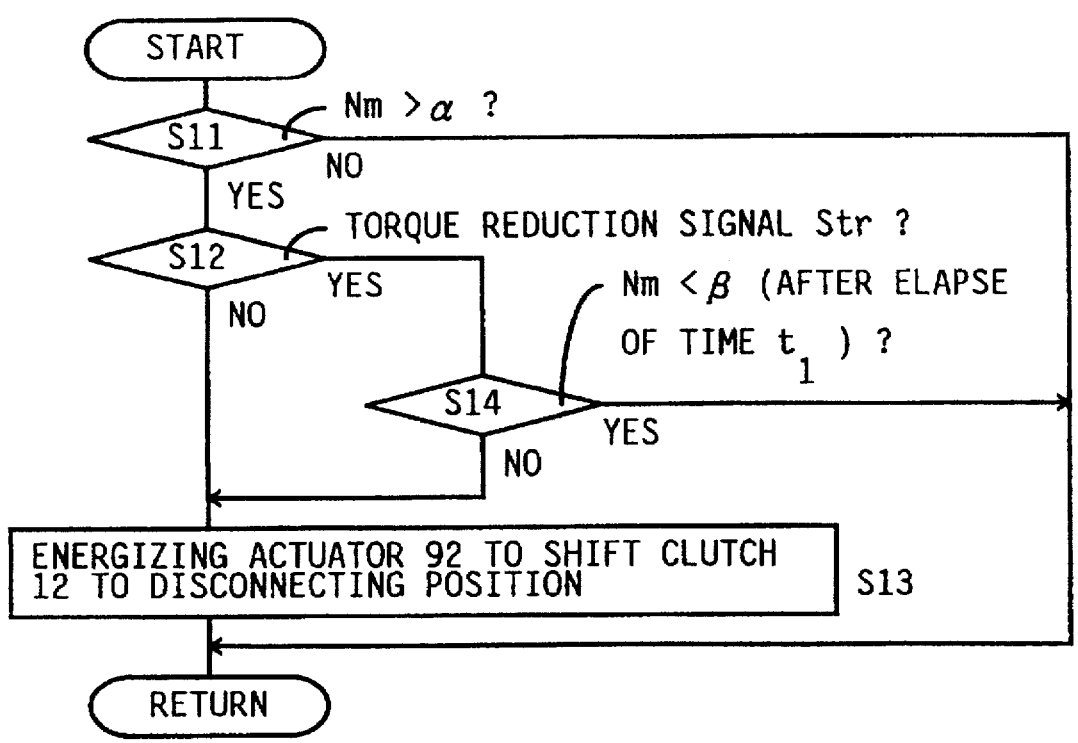
FIG. 11 is a flow chart illustrating a control program executed by the motor torque commanding device of FIG. 9, to energize the actuator of FIG. 10 upon detection of an abnormally high speed of the electric motor.

Referring to FIGS. 9–11, there will be described a second embodiment of the present invention, in which an electrically operated actuator 92 is connected to the lever 56 of the clutch operating mechanism 66. This actuator 92 is automatically energized by a NEUTRAL signal Sn generated by the motor torque commanding device 86 when the speed Nm of the electric motor 10 with the shift lever 60 placed in the DRIVE position D is abnormally high due to some trouble associated with the motor 10. The energization of the actuator 92 causes the mechanism 66 to shift the clutch 14 to the disconnecting position, and has the same effect as the operation of the shift lever 60 to the NEUTRAL position N.

In the present second embodiment, the motor torque commanding device 86 has a function of applying a TORQUE REDUCTION signal Str to the motor driver circuit 90, in the event that the speed Nm of the motor 10 exceeds a predetermined upper limit $\alpha$. This limit $\alpha$ is determined such that the motor speed Nm exceeding the limit $\alpha$ indicates some abnormality associated with the motor 10. In this event, therefore, the TORQUE REDUCTION signal Str is applied to the motor driver circuit 90 for the purpose of lowering the speed Nm of the motor 10, in order to avoid dangerous condition of the vehicle. As long as the control system is normally functioning, the TORQUE REDUCTION signal Str is generated upon abnormal rise of the motor speed Nm above the upper limit $\alpha$. Usually, the application of the TORQUE REDUCTION signal Str to the motor driver circuit 90 will cause the motor speed Nm to be lowered, in a relatively short time period, below a threshold level $\beta$, which is low enough to assure safe running of the vehicle.

The motor torque commanding device 86 of the second embodiment also has a function of applying the NEUTRAL signal Sn to the actuator 92, if the TORQUE REDUCTION signal Str is not present even after the motor speed Nm exceeds the upper limit $\alpha$, or if the motor speed Nm has not been lowered below the threshold $\beta$ a predetermined time $t_1$ after the signal Str is generated.

Referring to the flow chart of FIG. 11, there will be described a control routine executed by the commanding device 82 to deal with an excessive rise of the electric motor 10 while the vehicle is running with the shift lever 60 placed in the DRIVE position D.

This routine is initiated with step S11 to determine whether the current speed Nm of the electric motor 10 is higher than the predetermined upper limit $\alpha$. This limit may be a constant value or may be changed as a function of the operating amount Ac of the accelerator pedal represented by the ACCELERATOR signal SAc from the accelerator position sensor 88. If the motor speed Nm is not higher than the upper limit $\alpha$, one cycle of execution of the routine is completed. If the motor speed Nm exceeds the upper limit $\alpha$, the control flow goes to step S12 to determine whether the TORQUE REDUCTION signal Str is present. Usually, this signal Str is generated upon detection of the abnormally high motor speed Nm above the upper limit $\alpha$. If the signal Str is not present, however, the control goes to step S13 in which the NEUTRAL signal Sn is applied to the actuator 92 to shift the clutch 14 to the disconnecting position for disconnecting the speed reducing device 28 (drive wheels of the vehicle) from the electric motor 10.

If an affirmative decision (YES) is obtained in step S12, that is, if the TORQUE REDUCTION signal Str is present, step S14 is implemented to determine whether the speed Nm of the motor 10 has been lowered below the predetermined threshold $\beta$, after a predetermined time $t_1$ has passed after the generation of the signal Str. If the motor speed Nm has been lowered below the threshold $\beta$, the control returns to step S11. If the motor speed Nm is still higher than the threshold $\beta$ the predetermined time $t_1$ after the generation of the signal Str, step S14 is followed by step S13 to energize the actuator 92 to disconnect the speed reducing device 28 from the electric motor 10. The threshold $\beta$ may be a constant value or may be changed as a function of the operating amount Ac of the accelerator pedal.

While the present invention has been described above in its presently preferred embodiments by reference to the accompanying drawings, for illustrative purpose only, it is to be understood that the present invention may be otherwise embodied.

For instance, the clutch 14 may be disposed at any suitable position in the power transmitting line between the motor 10 and the drive wheel of the vehicle, for example, connected to the output shaft 24 of the speed reducing device 28.

Further, the clutch 14 and the shift lever 60 may be linked by a link mechanism other than the mechanism 66 which is also used to operate the lock mechanism 70, 72, 74 for locking the speed reducing device 28. That is, the clutch 14 is linked to the shift lever 60 by an exclusive linkage. It is noted that the lock mechanism 70, 72, 74 is not essential to practice the principle of the present invention. The lock mechanism 70, 72, 74 may be associated with the output shaft 24, rather than the motor shaft 12.

The cable 58 connecting the shift lever 60 and the lever 56 may be replaced by a suitable link mechanism which may include levers and/or link bars. Further, the shift rod 48 and the shift fork 46 used to axially move the sleeve 32 of the clutch 14 may be replaced by any other shift mechanism, which may include a pivotal link member.

Although the illustrated embodiments use the three-axis speed reducing device 28, the drive system may use any other types of speed reducing device, such as a two-axis type, a planetary gear type, and a variable transmission type employing clutches and brakes which are selectively operated to provide a plurality of speed reduction ratios.

While the clutch 14 used in the illustrated embodiments incorporates a synchronizing mechanism including the synchronizer ring 40, clutch means used in the drive system according to the present invention is not limited to such synchronous type, but may be of any type such as a hydraulically operated multiple- or single-disk frictional coupling type. When such a hydraulically operated frictional coupling type clutch device is used, a suitable switch valve is provided to control the clutch device in response to an operation of the shift lever 60. A hydraulic circuit including such switch valve is construed to be a clutch operating mechanism which operatively connects the shift lever 60 and the clutch means to control the clutch means.

The shift position sensor 84 used in the illustrated embodiments is capable of detecting all of the four operating positions P, R, N and D. However, the principle of the present invention may be practiced with a shift position sensor capable of detecting at least the NEUTRAL position N. Although the shift position sensor 84 is associated with the shift lever 60 itself, the sensor 84 may be replaced by a sensor which is associated with the lock rod 54, shift rod 48 or any other member which is moved when the shift lever 60 is operated.

In the illustrated embodiments, the speed Nin of the first small-diameter gear 16 as the input member of the speed reducing device 28 is calculated from the speed Nout of the output shaft 24 detected by the vehicle speed sensor 82, for controlling the motor 10 so that the speed Nm of the motor 10 is substantially equal to the calculated speed Nin. However, the speed Nin of the gear 16 may be directly detected by a sensor. While the illustrated embodiments are adapted to compare the motor speed Nm with the input speed Nin of the speed reducing device 28, it is possible to compare the motor speed Nm divided by the speed reduction ration "i" of the device 28 with the output speed Nout of the device 28.

While the optimum torque changing amount $T_O$ used to determine the torque adjusting amount $\Delta T$ is calculated as a function of the absolute value $|N_O|$ of the speed difference $N_O$, the optimum torque changing amount $T_O$ may be a predetermined constant value. The manner of determining the target torque $T^*$ in step SM4 of FIG. 6 may be modified as needed, provided the adjusted target torque $T^*$ results in zeroing the speed difference $|N_O|$ between the motor speed Nm and the input speed Nin of the speed reducing device 28.

Although the second embodiment is adapted to automatically energize the actuator 92 under the predetermined condition when the speed Nm of the electric motor 10 exceeds a predetermined upper limit, the condition to energize the actuator 92 may be suitably changed. Further, the electrically operated actuator 92 may be replaced by a hydraulically or pneumatically operated actuator. The actuator may be directly associated with the shift rod 48, shift fork 46 or sleeve 32 of the clutch 14.

The second embodiment may be adapted to execute the control routine of FIG. 11 also while the shift lever 60 is placed in the REVERSE position R.

It is to be understood that the present invention may be embodied with various other changes, modifications, and improvements, which may occur to those skilled in the art, without departing from the spirit and scope of the invention defining in the following claims.

What is claimed is:

1. A drive system for an electric motor vehicle, wherein the electric motor vehicle includes an electric motor and a drive wheel, and wherein the drive system transmits a rotary motion of the electric motor to the drive wheel, the drive system comprising:

a speed reducing device disposed between the electric motor and the drive wheel and having a single predetermined speed reduction ration;

a clutch disposed between said electric motor and an input member of the speed reducing device, the clutch connecting said electric motor to the drive wheel so that rotary motion of the electric motor is transmitted to the drive wheel and disconnecting the electric motor from the drive wheel so that rotary motion of the electric motor is not transmitted to the drive wheel, the clutch having a connecting position in which the electric motor is connected to the drive wheel and a disconnecting position in which the electric motor is disconnected from the drive wheel;

a shift lever having at least a drive position and a neutral position;

a clutch operating mechanism which operatively connects the shift lever and the clutch, such that when the shift lever is operated to the drive position, the clutch is in the connecting position and when the shift lever is operated to the neutral position, the clutch is in the disconnecting position;

a shift position sensor, said shift position sensor detecting an operation of said shift lever to said neutral position;

a first speed sensor, said first speed sensor detecting a speed of said electric motor;

a second speed sensor, said second speed sensor detecting a speed of said speed reducing device; and synchronizing means, operable when the operation of said shift lever to said neutral position is detected by said shift position sensor, for controlling said electric motor on the basis of outputs of said first and second speed sensors, such that the speed of said electric motor and a rotating speed of said input member of said speed reducing device substantially coincide with each other while said shift lever is placed in said neutral position.

2. A drive system according to claim 1, wherein said clutch operating mechanism includes a shift fork shifting said clutch between said connecting and disconnecting positions, and a linkage connected to said shift lever, said linkage including a first engaging portion which is engageable with said shift fork to move said shift fork and thereby shift said clutch to said disconnecting position when said shift lever is operated to said neutral position.

3. A drive system according to claim 2, wherein said clutch operating mechanism further includes a biasing element, the biasing element biasing said shift fork to a first position thereof so as to hold said clutch in said connecting position, said first engaging portion moving said shift fork to a second position thereof against a biasing force of said biasing element to shift said clutch to said disconnecting position when said shift lever is operated to said neutral position.

4. A drive system according to claim 3, further comprising a lock mechanism for locking said speed reducing device to thereby lock said drive wheel, wherein said shift lever further has a parking position, and wherein said linkage of said clutch operating mechanism further includes a second engaging portion which is engageable with said lock mechanism when said shift lever is operated to said parking position.

5. A drive system according to claim 4, wherein said first engaging portion of said linkage of said clutch operating mechanism permits said shift fork to be held in said first position when said shift lever is placed in said parking position.

6. A drive system according to claim 1, wherein said synchronizing means comprises:
  calculating means for calculating a difference between said speeds of said electric motor and said input member of said speed reducing device while said shift lever is placed in said neutral position;
  first determining means for determining a torque adjusting amount on the basis of said difference;
  second determining means for determining a target torque of said electric motor on the basis of said torque adjusting amount while said shift lever is placed in said neutral position; and
  control means for controlling said electric motor so that an actual torque of said electric motor coincides with said target torque determined by said second determining means.

7. A drive system according to claim 6, wherein said first determining means determines said torque adjusting amount on the basis of said difference when said difference is greater than a predetermined threshold, said first determining means determining said torque adjusting amount to be zero when said difference is not greater than said predetermined threshold.

8. A drive system according to claim 6, further comprising an accelerator position sensor for detecting an amount of operation of an accelerator pedal for accelerating the vehicle when said shift lever is placed in said drive position, and wherein said second determining means determines said said target torque of said electric motor on the basis of an output of said accelerator position sensor as well as on the basis of said torque adjusting amount determined by said first determining means while said shift lever is placed in said neutral position.

9. A drive system according to claim 6, wherein said first determining means determines said torque adjusting amount such that said torque adjusting amount increases with an increase in said difference calculated by said calculating means.

10. A drive system according to claim 9, wherein said speed reducing device has an output member operatively connected to said drive wheel, said second speed sensor detecting a rotating speed of said output member.

11. A drive system according to claim 10, wherein said synchronizing means further comprises means for calculating the rotating speed of said input member of said speed reducing device on the basis of the rotating speed of said output member and the speed reduction ratio of said speed reducing device.

12. A drive system according to claim 1, further comprising:
  an actuator for shifting said clutch to said disconnecting position; and
  control means for activating said actuator to shift said clutch to said disconnecting position, when an abnormal operating condition of said electric motor is detected during running of the vehicle.

13. A drive system according to claim 12, wherein said actuator is associated with said clutch operating mechanism to operate said clutch operating mechanism to shift said clutch to said disconnecting position when said actuator is activated by said control means.

14. A drive system according to claim 12, wherein said control means comprises detecting means for detecting, as said abnormal operating condition, an abnormal rise of the speed of said electric motor above a predetermined upper limit.

15. A drive system according to claim 14, wherein said control means further comprises speed lowering means for lowering the speed of said electric motor when said detecting means detects said abnormal rise, and activating means for activating said actuator if the speed of said electric motor has not been lowered below a predetermined threshold level a predetermined time after said abnormal rise is detected by said detecting means.

16. A drive system according to claim 15, wherein said control means controls said electric motor on the basis of an operating amount of an accelerator pedal while the vehicle is running with said shift lever placed in said drive position, said detecting means detecting said abnormal rise of the speed of said electric motor during running of the vehicle with said shift lever placed in said drive position.

17. A drive system according to claim 16, wherein said detecting means changes said upper limit as a function of said operating amount of said accelerator pedal.

\* \* \* \* \*

UNITED STATES PATENT AND TRADEMARK OFFICE
CERTIFICATE OF CORRECTION

PATENT NO. : 5,696,680
DATED : 9 December 1997
INVENTOR(S) : Eiji ICHIOKA et al.

It is certified that error appears in the above-identified patent and that said Letters Patent is hereby corrected as shown below:

| Column | Line | |
|--------|------|---|
| 5 | 65 | Change "fork 46" to --rod 48--; change "shift fork 48" to --shift fork 46--. |
| 8 | 41 | Change "S1" to --S1--. |
| 8 | 46 | Change "S1" to --S1-- (two occurrences). |
| 12 | 29 | Change "S11" to --S11--. |
| 12 | 54 | Change "S11" to --S11--. |

Signed and Sealed this

Twenty-sixth Day of May, 1998

Attest:

*Attesting Officer*

BRUCE LEHMAN

*Commissioner of Patents and Trademarks*